This invention relates to an improved process for the separation of a mixture by means of a selective solvent. More particularly, this invention is directed to an improvement of a conventional process employed for the recovery of aromatics from aromatic-containing feed stocks.

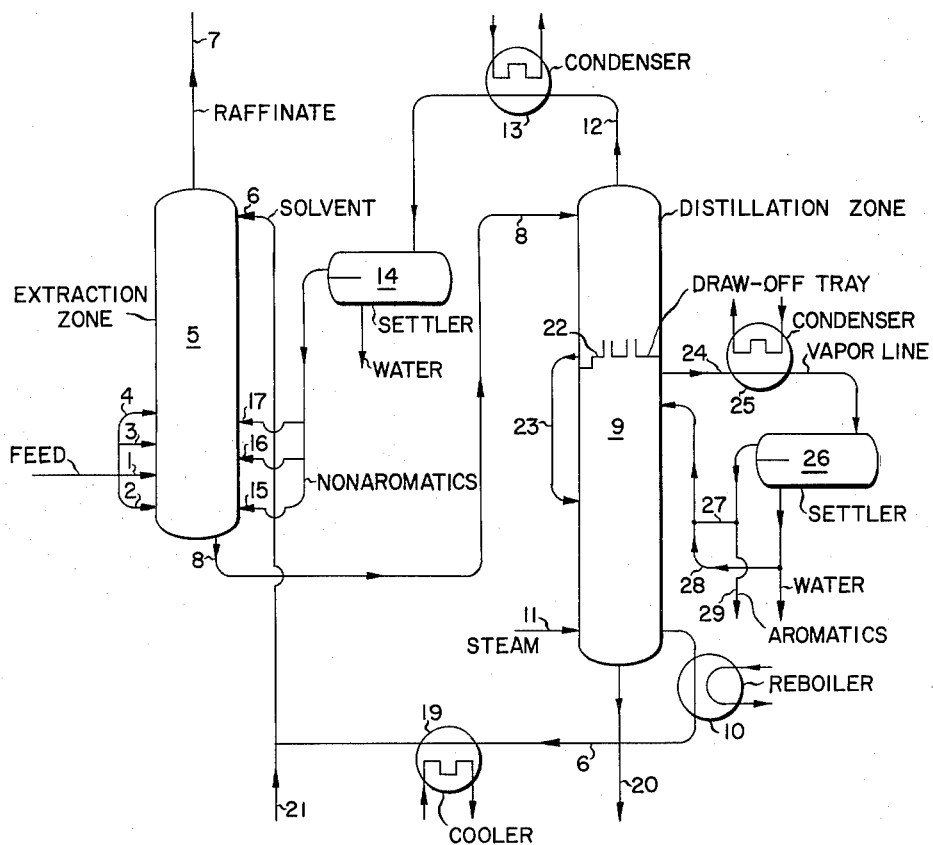
FIG. I
INVENTORS:
ALFRED L. VAN KLEEF
WALTER C. G. KOSTERS

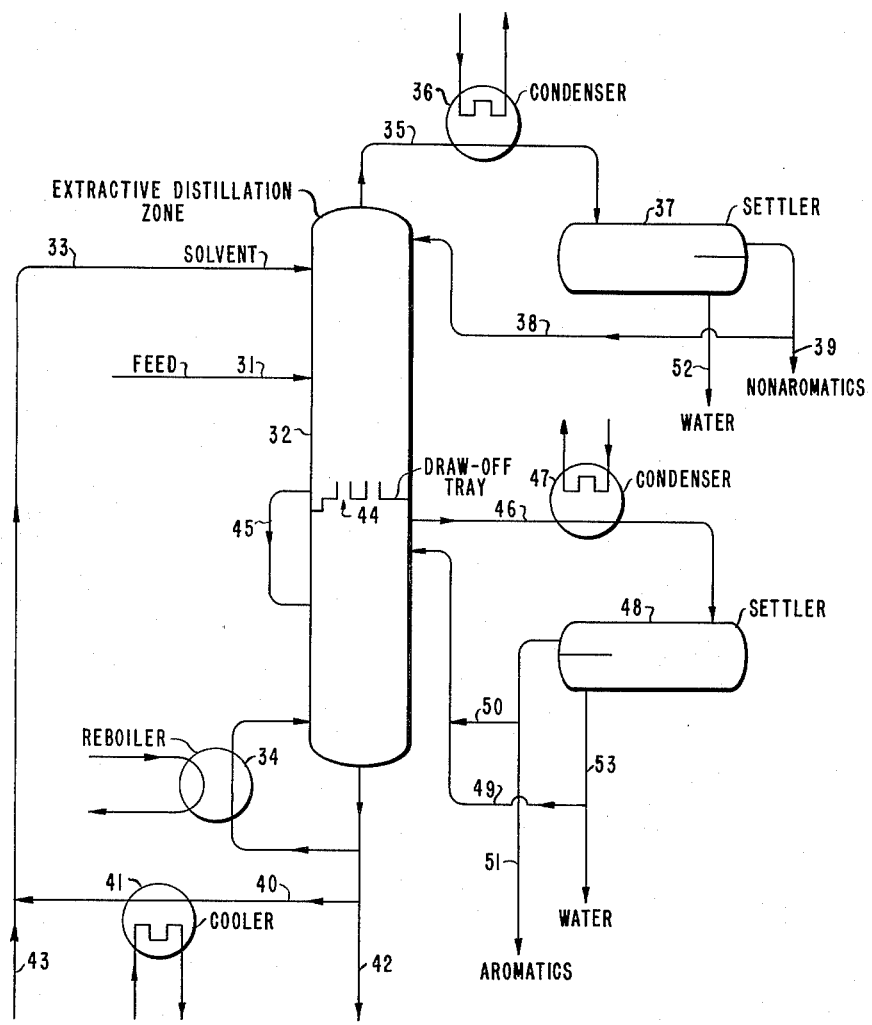
FIG. II 3,207,692
PROCESS FOR SEPARATION OF A SOLVENT
BY DISTILLATION
Alfred L. Van Kleef and Walter C. G. Kosters, The
Hague, Netherlands, assignors to Shell Oil Company,
New York, N.Y., a corporation of Delaware
Filed Mar. 6, 1962, Ser. No. 177,865
Claims priority, application Netherlands, Mar. 23, 1961,
262,762, 262,763
19 Claims. (Cl. 208—313)

In a conventional separation process the aromatic materials are recovered by means of extraction with a selective solvent wherein the extract phase recovered is introduced into the upper portion of a distillation zone which is provided with a contact material, such as trays, from which: (1) an overhead fraction is withdrawn consisting essentially of the non-aromatic components of the feed, which components are less soluble in the selective solvent; (2) a bottom fraction is withdrawn consisting essentially of the selective solvent; and (3) a side stream is withdrawn consisting of one or more components which are more readily soluble in the solvent.

Similarly, in another conventional separation process, i.e., extractive distillation, the aromatic materials are recovered by means of an extractive distillation with a selective solvent wherein the extract phase recovered as a bottom product consists of the selective solvent and certain components of the feed which are more readily soluble therein. Conventionally this extract phase is subjected to further treatment in order to recover the more readily soluble components therefrom. The further working up of the extract phase or bottom product necessary to recover the more readily soluble components contained therein is usually accomplished in a solvent stripping zone. Unless such a zone is provided in a conventional extractive distillation process, a significant amount of the desired aromatic product is not recovered in the extractive distillation process and also the capacity of the selective solvent withdrawn from the extract phase and recycled as solvent to the top of the extractive distillation zone is significantly reduced by the aromatics contained therein. Therefore, it is readily apparent that the over-all effectiveness of such an extractive distillation process would be significantly reduced if the more readily soluble aromatic components contained in the solvent were recycled directly to the top of the extractive distillation zone.

It has now been found that, in such conventional extraction/extractive-distillation separation processes, the aromatic streams from the separation zone, i.e., the distillation or extractive distillation zone, frequently are not recovered in the desired quantity nor in the degree of purity often required and further a significant loss of solvent is often encountered. For example, the top product from the distillation or extractive distillation zone usually consists essentially of the less soluble components of the feed, i.e., non-aromatics. It will also contain some of the more readily soluble feed components (i.e., aromatics), thereby preventing complete recovery of the selectively dissolved aromatic components from the feed. Therefore, it is not uncommon today for the overhead fractions from the distillation zone to be returned to the extraction zone to insure a more complete recovery of the selectively dissolved components, i.e., aromatics. However, it is readily apparent that the over-all effectiveness of such a process is thereby significantly reduced as the more readily soluble aromatic components are present in the recycled stream.

A second problem encountered when employing the general process as described above is that the high-purity aromatic product withdrawn as a side stream from the distillation or extractive distillation zone often contains a significant quantity of the selective solvent employed in the extraction zone, thereby resulting in a significant loss of solvent. In order to avoid this undesirable solvent loss, additional process steps are often employed. That is, the selective solvent in the aromatic finished product may be separated therefrom by (1) distillation or (2) by washing the product with water. However, the former method requires an additional distillation column and the necessary equipment and energy for its operation, whereas process, the selective solvent is lost in the washing agent Although it is true that the desired components are generally recovered in a sufficiently pure state by the washing process, the selective solvent is lost in the washing agent unless other provisions are provided for solvent recovery.

Therefore, it is an object of this invention to provide an improved process for the separation of mixtures of hydrocarbons. It is a further object of this invention to provide an improved process for the recovery of aromatics from non-aromatics wherein significant loss of solvent is avoided. A still further object is to provide an improved separation process for the recovery of high-purity aromatics with a selective solvent. Another object of the invention is to provide an improved process for the recovery of high-purity aromatics in high yields from various feeds containing non-aromatic components wherein said feedstocks have an appreciable broad boiling range. Another object of the invention is to provide an improved extractive distillation process wherein the extract phase withdrawn as bottoms product from the extractive distillation zone is essentially free of feed components and consists essentially of the selective solvent. A further object of the invention is to avoid the need for further treatment of the extract phase and to provide improvement in extractive distillation whereby the bottom product can be reintroduced directly into the extractive distillation zone as a selective solvent. Another object of the invention is to provide an improved extractive distillation process for the recovery of high-purity aromatics and non-aromatics in high yields directly from the extractive distillation zone. Other objects and advantages of this invention will become apparent in the description thereof, which is made with reference to the accompanying drawings, which consist of two figures which are schematic diagrams of preferred embodiments of the process.

It has now been discovered that products having a high degree of purity can be recovered in significantly improved yields without significant solvent losses by means of the instant invention. The process of the invention employs conventional extraction/extractive distillation processes, as described above, provided that the distillation column employed in said processes is fitted with at least one draw-off tray. This draw-off tray is critically situated below the point of introduction of the extract phase or (in the extractive distillation zone) below the points of introduction of the feed and the selective solvent and is pervious to gas and impervious or substantially impervious to liquid. Further, it is essential that the liquid accumulated on the draw-off tray be withdrawn therefrom and reintroduced into the section of the distillation or extractive distillation zone below the draw-off tray. Further, it is essential to the instant process that the liquid accumulated on the draw-off tray be introduced into the lower section of the distillation or extractive distillation zone at a point at least one theoretical stage below the draw-off tray.

Further, it has been found necessary for the instant invention that a second quantity of liquid material be introduced into the distillation or extractive distillation zone between said draw-off tray and the lower part of the distillation or extractive distillation zone, and that a vapor side stream be withdrawn from the lower part of the distillation or extractive distillation zone at a point below the draw-off tray and above the point of introduction of either liquid streams. Preferably, the second liquid material introduced into the lower portion of the distillation or extractive distillation zone consists at least substantially of the main constituents of the vapor stream withdrawn from the distillation or extractive distillation zone by means of the vapor side stream line located below the draw-off tray. The main constituents of the second liquid introduced into the lower portion of the distillation or extractive distillation zone may contain the more readily soluble components of the extract phase, i.e., aromatics or a substance which is substantially absent from the starting mixture, for example, a substance added to the solvent to improve the selectivity and/or a solvent power, i.e., water, or a condensible stripping medium used in the distillation column or the like. Hence, water, which is frequently employed in either of these capacities (in the latter case in the form of steam), is often one of the main constituents of the second liquid stream introduced into the distillation zone at a point below the draw-off tray.

A suitable vapor-pervious, liquid-impervious zone can be used in place of the instantly described draw-off tray, provided that the zone does in fact allow the vaporous materials to pass through the zone while preventing the passage of liquid and collecting the latter so that it may be withdrawn from the zone and reintroduced into the process if desired. Therefore, for purposes of discussion it will be assumed that such a zone could be used wherever reference is made to a draw-off tray.

The liquid accumulating on the draw-off tray is withdrawn from the distillation zone and reintroduced thereto at a point below the draw-off tray by means of a line (provided within or outside the zone) which starts from the draw-off tray and issues into the lower part of the zone. This liquid is then contacted with the vapor in the lower section of the distillation or extractive distillation zone. It has been found critical to the instant invention that liquid accumulating on the draw-off tray be reintroduced into the lower part of the distillation or extractive distillation zone at least one theoretical stage below the draw-off tray and preferably not more than three theoretical stages below the draw-off tray.

If desired, the liquid discharged from the draw-off tray may be heated prior to reintroduction into the lower part of the zone. This heating may be achieved by passing the withdrawn liquid through a heat exchanger arranged outside the distillation or extractive distillation zone. The liquid is preferably heated so that a partial evaporation occurs; after which the resultant vapor is separated from the remaining liquid with only the remaining liquid being introduced into the lower part of the distillation or extractive distillation zone, with the resultant vapor being reintroduced into the zone preferably immediately above the draw-off tray (i.e., in the next theoretical stage). If desired, the partial evaporation required in this embodiment of the process may be effected in a manner other than by heating only. When the invention is utilized in an extractive distillation process, a purified solvent essentially free of feed components is recovered as the bottom product of the extractive distillation zone. Since the bottom product is no longer an extract phase containing solvent and the more readily soluble components of the feed but rather consists substantially of lean solvent, this bottoms product may be recycled directly to the upper portion of the extractive distillation zone as selective solvent.

The vapor side stream withdrawn from the lower part of the zone preferably is withdrawn from the first theoretical stage below the draw-off tray. The second liquid material, introduced into the lower portion of the distillation or extractive distillation zone, can be introduced into said zone at the same theoretical stage but preferably below the point at which the vapor stream is withdrawn. In a preferred embodiment, the second liquid material may be introduced to the distillation or extractive distillation zone one tray below the draw-off tray with the vapor side stream being withdrawn from the distillation or extractive distillation zone at a point between the draw-off tray and the next lower tray.

By means of the instant process, the vapor side stream withdrawn from the distillation or extractive distillation zone is substantially free from the selective solvent employed in the extraction or extractive distillation zone, thereby avoiding significant solvent loss. Since the vapor flowing through the vapor-pervious draw-off tray has the same composition as the vapor side stream withdrawn, it is substantially free from solvent. Therefore, the conditions in the upper part of the distillation zone are such that a proper separation is achieved between the less readily soluble component (non-aromatics) and the solvent containing the more readily soluble component (aromatics). Consequently, the overhead product withdrawn from the top of the distillation zone has only a small content of the more readily soluble (aromatic) components and selective solvent.

This satisfactory separation between the aromatic and non-aromatic components in the distillation zone is further improved by certain additional modifications to the distillation zone. For example, the areas below and above the draw-off tray are provided with trays (preferably valved trays as described, for example, in Belgian Patent 591,929, or trays provided with one or more zones with preferential discharge as disclosed, for example, in United Kingdom Patent 764,650). In a further preferred embodiment of the invention, the extract phase is preferentially introduced into the upper part of the distillation zone without substantial flash vaporization.

The weight ratio of vaporous material present in the extract phase (when the latter is introduced into the distillation zone) to the fresh feed supplied to the extraction zone should preferably be below about 1:10. In a further preferred embodiment, this ratio should be below about 5:100 and in a particularly preferred embodiment vaporous material is entirely absent.

Since the second liquid material which is introduced into the distillation zone at a point below the draw-off tray must contain one or more of the main constituents of the vaporous side stream withdrawn from the distillation zone below the draw-off tray it is advisable to prepare this material from the vaporous side stream itself, which may be done in a simple manner by cooling and (partial or total) condensation; the resultant condensate is the relevant liquid material or yields it.

When the vaporous side stream withdrawn from the distillation zone contains a substance foreign to the starting material, the condensate thereof may be suitably separated into at least two liquid phases, of which at least one substantially consists of the more readily soluble components (aromatics which are not miscible in all ratios with the foreign material). The second liquid phase consists essentially of the foreign substance not occurring in the starting mixture (e.g., water). Hence, these phases comprise the main components of the side stream so that one of them may advantageously be employed in whole or in part as the second liquid material introduced into the lower portion of the distillation zone.

In principle, a wide variety of selective solvents may be used in the process of the invention, for example, furfural, phenol, acetonitrile, a solvent of the glycol type, such as diethylene or dipropylene glycol, and the like.

The present process is particularly useful when the selective solvent is a solvent, preferably a dry solvent, of the sulfolane type. By a solvent of the sulfolane type is meant a solvent at least substantially consisting of sulfolane itself and/or one more sulfolane derivatives, such as disclosed in U.K. patent specification 625,505. A solvent of this type preferably contains the lowest possible quantity of water, since excessive water content may adversely affect the solvent power of the solvent. But in practice it is often difficult to avoid some water contamination of the solvent. For example, it is often advantageous to introduce steam into the bottom of the distillation column to strip dissolved hydrocarbon from the solvent, as a result of which the distillation zone bottoms product consisting substantially of solvent will also contain some water. This water-containing bottoms product, optionally made up with fresh solvent, is generally re-used in the instant process (as shown in U.K. patent specification No. 717,725).

The sulfolane solvents which can be used according to this invention should preferably be selective to aromatics. Further, the solvent must be stable at the extraction and distillation temperatures maintained in the extraction, extractive distillation, and distillation zones. That is, the solvent must be sufficiently heat-stable so that it may at least partially vaporize without decomposition in the presence of the components of the mixture.

The sulfolane solvents of the invention may be made by condensing a conjugated diolefin with sulfur dioxide and then subjecting the resulting product to hydrogenation, alkylation, hydration and/or other substitution or addition reactions. A 2-sulfolene may be made similarly by isomerizing instead of by hydrogenating the product resulting from condensing a conjugated diolefin with sulfur dioxide. Unsubstituted sulfolane, the preferred sulfolane solvent in the process of the invention, has the formula:

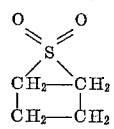

and 2-sulfolene has the formula:

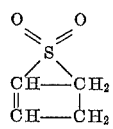

Other solvents which have high selectivity for separating aromatics from non-aromatic hydrocarbons are: 2-methylsulfolane, 2,4-dimethylsulfolane, 2,4-dimethyl-4-sulfolane, methyl 3-sulfolanyl ether, ethyl-3-sulfolanyl sulfide, methyl-aryl-3-sulfolanyl ether, n-aryl-3-sulfolanyl amine, 3-sulfolanyl acetate, and others.

The present process can be applied to numerous feed stocks having various boiling ranges wherein the component groups to be separated may be, for example, paraffinic and non-paraffinic (i.e., olefinic), aromatic and non-aromatic, heavy and light aromatic, paraffinic or other hydrocarbons, and also various non-hydrocarbons such as alcohols and esters. The instant process is especially suitable for the recovery of (1) aromatics from catalytically reformed gasoline fractions, such as hydroformates and platformates, (2) fractions of gasoline obtained as by-products in the preparation of lower olefins by severe thermal cracking, with or without the use of steam, (3) hydrocarbon materials, as described in the Belgian patent specification No. 596,748, and (4) fractions of light hydrocarbon oils obtained as by-products in the preparation of coke from coal. A refining treatment, preferably a hydrogenative refining treatment, is suitably applied to such by-products to reduce the olefin content before they are subjected to the instant process.

To insure that the solvent actually boils higher than the mixture to be separated, it is in most cases desirable for the latter to have an ASTM final boiling point of not higher than 220° C. Preferably the upper cutting point should not be higher than 160° C. When using a reformate fraction as a starting material, the upper cutting point should advantageously be approximately the same as the upper distillation cutting point of the feedstock for the reforming operation. The lower cutting point of the feedstock should preferably be about 65° C.

The starting mixture may be treated in a known manner to produce the extract phase (liquid-liquid extraction or extractive distillation). If extractive distillation is used it is preferably also carried out in a column provided with valve trays, or trays with preferential discharge (as referred to above) although a column provided with other contact material (for instance packing units, sieve trays or grid trays, bubble cap trays, and the like) may also be employed.

When extractive distillation is employed, the feedstock is suitably introduced into the extractive distillation zone at an intermediate point with the selective solvent being introduced at a higher point. However, all or a portion of the feed and solvent may be mixed first with the mixture then being introduced into the zone. In general, the zone will be operated in a conventional manner with the use of reflux and reboiling. It is also possible, however, to dispense with the reflux, in which case the solvent is preferably introduced into the top of the column. Moreover, the required heat can be introduced other than by means of a reboiler, for example, by introducing hot steam into the bottom part of the zone.

If a liquid-liquid extraction process is used, it should preferably be carried out in a countercurrent multi-stage extraction zone (the number of theoretical stages being preferably at least 5), for instance an extraction column containing packing material or sieve plates, or a multiplicity of mixer-settler combinations. A rotating disc contactor as described in the U.S. Patent 2,601,674, of June 24, 1952, to Reman is particularly preferred.

The feed to be separated may be introduced at an intermediate point into the multistage extraction zone but it is generally preferred to introduce the feed at or near that end of the extraction zone from which the extract phase is withdrawn. In this manner, the most efficient compromise between product purity and product recovery is usually realized. Suitable inlet points in the extraction zone are at the first theoretical stage or at the second theoretical stage, with the latter being preferred because the purity is dictinctly higher while the recovery is only slightly decreased. Feed introduction at a plurality of points in the extraction zone may be useful under specific circumstances.

If the stream obtained as a top product from the distillation zone is returned, after condensation, to the extraction zone, it may also be suitably introduced at one or more points at or near the end of the (multi-stage) extraction zone from which the extract phase is withdrawn. Preferably, the distillation product is recycled to the first or second theoretical stage in the extraction zone in order to achieve the best compromise between product purity and recovery. If necessary, the recycle stream may be heated before entering the extraction zone.

When carrying out the process according to the invention, the amount of the solvent employed should be at least sufficient to dissolve the constituent to be extracted or separated. In some cases a considerable excess over this amount may be used especially when it is desired to extract the last traces of the more soluble aromatic constituents from the feed. The most economical amount varies with the nature of the particular solvent involved, the temperatures and pressures employed, and the particular feed mixture to be extracted or extractively distilled. This amount can be determined experimentally. Useful solvent-to-feed ratios in the extraction or extractive distillation zone may range from between about 1:1 to about 6:1 and preferably between about 2:1 and 3:1 (for example, with the use of a sulfolane solvent), a slightly higher ratio is required, viz between about 4:1 and about 12:1, preferably between about 6:1 and about 9:1 with the use of a solvent of the glycol type. If the top product from the distillation zone is returned to an extraction zone the ratio of the quantity of this top product to fresh feed is suitably between about 0.1:1 and about 0.7:1, preferably between about 0.4:1 and about 0.5:1.

If the whole or part of the fraction obtained as bottom product from the distillation or extractive distillation zone is to be re-used as selective solvent in the extraction zone, this fraction or the relevant part thereof is preferably first cooled. Cooling is particularly useful when a solvent of the sulfolane type is employed, the cooling taking place until a difference in temperature before and after cooling is obtained of about 10 to 120° C. and preferably of about 40° C. to about 80° C.

When using a liquid-liquid extraction zone, the distillation zone is generally operated at a pressure which is lower than that prevailing in the extraction zone. The latter pressure should be sufficiently high to insure that only material in the liquid phase is present in this system (with the possible exception of a quantity of inert gas which is sometimes used in an extraction treatment); as stated above, the difference between the two pressures should, however, not be such as to cause appreciable flash vaporization.

The invention will be further illustrated with reference to the accompanying drawings. The apparatus employed in this process may be any conventional or convenient type known to those skilled in the art. For simplicity, the drawings do not show all the pumps, tanks, heat exchangers, valves, bypasses, vents, reboilers, condensers, coolers, and other auxiliaries that may be necessary for the proper operation of the process, but the inclusion of which will be evident to those skilled in the art.

FIGURE I of the drawing shows an embodiment of the inventive process whereby the mixture to be separated, containing aromatic and non-aromatic hydrocarbons, is introduced through one or more lines 1 through 4 into extraction zone 5. Extraction zone 5 is preferably a rotating disc multi-stage extractor. The mixture then countercurrently contacts a liquid sulfolane selective solvent, introduced into the opposite end of extraction zone 5 through line 6. The extraction zone is operated at a pressure of about 6 atm. absolute and a temperature of about 100° C.

A raffinate phase, containing the non-aromatic hydrocarbons and relatively small quantities of solvent and aromatic hydrocarbons, is removed from the top of extraction zone 5 through line 7. The raffinate can further be treated to remove the solvent present therein, for example, by means of water-washing (not shown).

An aromatic-rich extract phase is withdrawn from the bottom of extraction zone 5 through line 8 and can be passed through a reducing valve (not shown) to distillation zone 9. The bottom and the top areas of distillation zone 9 are fitted with trays (not shown) which are provided with preferential discharge zones. The extract phase is introduced at or near the top of distillation zone 9 via line 8. The pressure in distillation zone 9 is at least about 1 atm. absolute but it is lower than the pressure in extraction zone 5. Heat may be supplied to distillation zone 9 in any suitable manner, for example, by means of reboiler 10. Steam is also introduced into the bottom of distillation zone 9 through line 11 to strip the dissolved hydrocarbons from the descending liquid. In the distillation zone separation is effected into a top product mainly consisting substantially of all the non-aromatic hydrocarbons present in the extract phase, and some water and a bottom product which contains very little water and which consists substantially of the selective solvent and the aromatic constituents of the extract phase. The top vapors from zone 9 have a temperature of about 100° C. and are passed through line 12 to condenser 13. The resultant condensate is introduced into settler 14 wherein separation takes place in a water-rich layer and a layer consisting (substantially) of hydrocarbons. Both layers are removed, with the hydrocarbon layer being reintroduced into the lower portion of extraction zone 5 wholly or in part through lines 15, 16 and 17.

The bottom (solvent) product withdrawn from distillation zone 9 has a temperature of about 180° C. and is returned to extraction zone 5 through line 6 after being cooled by about 70° C. in cooler 19. If desired, a slip stream of approximately 5 to 10% of the total solvent inventory can be passed to a solvent clean-up system (not shown) by means of valved line 20, with fresh or purified solvent being introduced into line 6 through valved line 21.

As discussed previously, one of the trays (22) in the top part of the distillation zone 9 is designed as a draw-off tray which is pervious to vapor but substantially impervious to liquid. Under certain conditions, a set of two or more draw-off trays may be employed instead of single tray 22 as a safeguard against leakage of the liquid. The sulfolane-rich liquid accumulating on tray 22 is introduced through line 23 (which in the drawing is situated outside the column but which may also be provided within it) into the bottom part of distillation zone 9 at a point which is situated three theoretical stages below the draw-off tray. A portion of the vapor present just below draw-off tray 22 (in the next theoretical stage below) is withdrawn from the zone via line 24 with the remainder of the vapor passing through vapor-pervious tray 22 into the upper part of distillation zone 9. The vapor withdrawn via line 24 is condensed in condenser 25 with the condensate collected in settler 26. The major portion of the condensate consists essentially of aromatics and water and is substantially free from sulfolane. However, the water is separated from the aromatics in settler 26. The water-rich layer and/or a portion of the hydrocarbon layer is returned, at least in part, through lines 28 and/or line 27 to that part of distillation zone 9 immediately below draw-off tray 22 and below vapor discharge line 24. Any portion of either the aromatic or water layers which is not returned to the distillation zone is removed from settler 26 with the aromatic-rich materials being withdrawn as the product of the process through line 29 and the water being withdrawn by means of line 28. Instead of, or in addition to an aromatic-rich product being withdrawn through line 29, this product may, of course, also be removed as vapor upstream (not shown) or from condenser 25 and/or as liquid between the condenser 25 and settler 26 (not shown).

If portions of the water-rich layer and of the hydrocarbon layer from settler 26 are returned to the distillation zone, they may be introduced at the same point or at different points into the distillation zone provided they are situated in the appropriate theoretical stage below the draw-off tray 22. In the case where both water and aromatics are returned to distillation zone 9, the need for settler 26 can be avoided, i.e., by directly returning a portion of the condensate from condenser 25 to the distillation zone. Settler 26 is particularly useful, however, if the material used for recycling is required to be withdrawn solely from the water layer or solely from the hydrocarbon layer.

The whole or part of the water-rich layer optionally removed from settler 26 may, if desired, be used in a washing treatment (not shown) of the raffinate withdrawn from extraction zone 5, or (after the layer has or has not been used as washing agent) as coolant, for example, in coolers 19 or 13, and/or the water may be used for the preparation of (a portion of) the stripping steam to be introduced into distillation zone 9 through line 11. The water-rich layer from settler 14 may similarly be used as a coolant and/or for the preparation of steam, but it is preferably not employed as a washing agent since it generally has a slightly higher solvent content.

The invention is further illustrated with reference to the following example.

*Example I*

The following process was effected in a system of the type shown in FIGURE I and is described with reference to said drawing.

A quantity of 1000 tons/day of a platformate which had a boiling range of from about 100° C. to about 160° C. and consisted of about 67% aromatics and about 33% non-aromatics (substantially paraffinic hydrocarbons) was introduced into extraction zone 5 through lines 1 to 4 and subjected to a liquid-liquid extraction. Extraction zone 5 was equipped with a rotating disc contactor. 2500 tons/day of sulfolane solvent was introduced through line 6.

The pressure and temperature in extraction zone 5 was 6 atmospheres and 110° C., respectively. 350 tons/day of a paraffinic raffinate product was discharged through line 7. The extract phase discharged through line 8 was introduced into the top of distillation zone 9 which was operated at atmospheric pressure, with a top temperature of 110° C. and a bottom temperature of 170° C. Distillation zone 9 was equipped with two draw-off trays. 200 tons/day of stripping steam was introduced into the lower portion of distillation zone 9 through line 11. The top product from distillation zone 9 was recycled to extraction zone 5 after (a) cooling to 40° C. in the cooler 13, (b) separating the non-aromatic hydrocarbon from the completely condensed mixture in settler 14, and (c) reheating the non-aromatic hydrocarbons to the extraction temperature. Approximately 500 tons/day of the non-aromatic hydrocarbon was recycled.

The liquid which accumulated on the set of two draw-off trays (which were used in place of a single tray as shown in the drawing) consisted of about 74% by weight sulfolane and in addition to aromatics also contained a minimum quantity of non-aromatics and water. The accumulating liquid was withdrawn via line 23 and re-introduced through line 23 into the lower portion of zone 9 at a point situated three theoretical stages (i.e., in this case six actual stages) below the draw-off trays. The bottom product withdrawn from distillation zone 9 via line 6 contained some water and a very slight quantity of aromatics in addition to the sulfolane solvent and was recycled as solvent to extraction zone 5 after being cooled in cooler 19 to the extraction temperature. The coolant used in cooler 19 consisted of some of the water separated in settler 14.

A vapor stream was withdrawn from distillation zone 9, by means of line 24, immediately below the lowest tray of the set of draw-off trays. The vapor stream was cooled in cooler 25 to 40° C. and completely condensed. A portion of the hydrocarbon condensate was recycled to distillation zone 9 through line 27 after the water had been separated in settler 26, with a quantity of 650 tons of aromatics per day being removed as aromatic extract product via line 29. This product contained only traces of sulfolane, i.e., approximately 0.005%, and more than 99% consisted of aromatics. A portion of the separated water withdrawn via line 28 from settler 26 was used as coolant in cooler 19, with another portion being employed as washing agent for the raffinate withdrawn via line 7 from extraction zone 5. This wash water was then also used as a coolant in cooler 19. The water heated in cooler 19 (i.e., both the water originally derived from settler 14 and that from settler vessel 26) was used for the preparation of the stripping steam introduced into distillation zone 9 via line 11.

FIGURE II of the drawing shows an embodiment of the process of the invention, using extractive distillation for treating the starting mixture. The feed mixture to be separated, containing aromatic and non-aromatic hydrocarbons, is introduced through line 31 into extractive distillation zone 32. Extractive distillation zone 32 is preferably provided with trays (not shown) having preferential discharge zones. The feed mixture contacts a liquid sulfolane selective solvent, introduced into extractive distillation zone 32 through line 33. The extractive distillation zone is operated at a pressure of about 1 atm. aboslute. Heat is supplied to zone 32 by means of reboiler 34. Steam may also be introduced into the bottom of the zone (not shown) to remove dissolved hydrocarbons from the descending liquid.

In zone 32 separation is effected into a top product consisting essentially of all the non-aromatic hydrocarbons present in the feed, and some water, and a bottom product containing little water and consisting essentially of solvent. The top vapors from zone 32 are passed through line 35 to condenser 36 and the resultant condensate to settler 37 in which separation takes place into a water-rich layer and a layer consisting essentially of non-aromatic hydrocarbons. The water-rich layer is removed by line 52 with a portion of the non-aromatic hydrocarbon material being recycled as reflux through line 38 to the top of zone 32. The remainder of this layer which contains relatively small quantities of solvent and aromatic hydrocarbons in addition to the non-aromatic hydrocarbons is passed out of the system as the top product through line 39. It is generally not necessary to subject this top product to further treatment to remove solvent since the overhead stream is substantially free from solvent when zone 32 is operated with reflux. If zone 32 were operated without reflux it would, however, be preferable to subject the top product to a further treatment, for example, to a water-washing treatment. Instead of or in addition to withdrawing the non-aromatics through line 39, the overhead stream may also be removed as a vapor upstream from condenser 36 or alternatively as a liquid between condenser 36 and settler 37.

The bottom product withdrawn from distillation zone 32 is returned through line 40 to the zone 32 after cooling by about 70° C. in cooler 41. If desired, part of the bottom product may be passed by means of line 42 to a solvent clean-up system (not shown) with fresh or purified solvent being introduced through valved line 43.

As discussed previously, one of the trays, 44, in the top part of extractive distillation zone 32 is designed as a draw-off tray which is pervious to vapor but substantially impervious to liquid. Under certain conditions, a set of two or more draw-off trays may be employed instead of single tray 44 as a safeguard against leakage of the liquid. The sulfolane-rich liquid accumulating on tray 44 is introduced through line 45 (which in the drawing is situated outside the zone but which may also be provided within it) into the bottom part of distillation zone 32 at a point which is situated three theoretical stages below the draw-off tray. A portion of the vapor present just below draw-off tray 44 (in the next theoretical stage below) is withdrawn from the zone by means of line 46 with the remainder of the vapor passing through vapor pervious tray 44 into the upper part of zone 32. The vapor withdrawn via line 46 is condensed in condenser 47 with the condensate collected in settler 48. A major portion of the condensate consists essentially of aromatics and water and is substantially free from the sulfolane solvent. However, the water contained in the condensate is separated from the aromatics by means of settler 48. The water-rich layer and/or a portion of the hydrocarbon layer is returned, at least in part, through lines 49 and/or line 50 to that part of extractive distillation zone 32 immediately below draw-off tray 44 and below vapor discharge line 46. Any portion of either the aromatic or water layers which is not returned to the extractive distillation zone is removed from settler 48 with the aromatic-rich materials being withdrawn as the product of the process through line 51 and the water being withdrawn by means of line 53. Instead of, or in addition to, an aromatic-rich product being withdrawn through line 51, this product may, of course, also be removed as vapor upstream (not shown) or from condenser 47 and/or as liquid (not shown) between the condenser 47 and settler 48.

If portions of the water-rich layer and of the hydrocarbon layer from settler 48 are returned to the extractive distillation zone, they may be introduced at the same point or at different points into the extractive distillation zone provided they are situated in the appropriate theoretical stage below draw-off tray 44. In the case where both water and aromatics are returned to zone 32, the need for settler 48 can be avoided, i.e., by directly returning a portion of the condensate from condenser 47 to the lower section of extractive distillation zone 32. Settler 48 is particularly useful, however, if the material used for recycling is required to be withdrawn solely from the water layer or solely from the hydrocarbon layer.

The whole or part of the water-rich layer optionally removed from settlers 37 and 48 may, if desired, be used in a washing treatment (not shown) of the top product withdrawn from extraction zone 32 by means of line 39. Also the water layer can be used as coolant, for example, in cooler 41, and/or the water may be used for the preparation of (a portion of) the stripping steam which may optionally be introduced into the lower part of extractive distillation zone 32.

The various manipulative schemes with respect to the use of the water of the process as a coolant, washing agent and source of stripping steam have not been specifically set forth in the drawings and are believed within ordinary skill of one skilled in the art.

We claim as our invention:

1. In a process for the separtion of mixtures by means of a selective solvent boiling higher than the mixture, wherein at least one of the components of the mixture is more readily soluble in the solvent and at least one other component is less readily soluble in the solvent and wherein the phase containing the solvent is recovered from a separation zone, and wherein the top product withdrawn from the separation zone comprises at least one of the less readily soluble components, and the bottoms product withdrawn comprises the selective solvent, and a side stream is withdrawn comprising at least one of the more readily soluble components, the improvement comprising (1) providing said separation zone with a vapor-pervious liquid-impervious zone which is situated below the points of introduction of the feed and the solvent, (2) withdrawing the liquid accumulated in the vapor-pervious liquid-impervious zone and, without further treatment, discharging the liquid so accumulated at least in part, into such lower part of the separation zone that there is at least one theoretical stage between the said part and the vapor-pervious, liquid-impervious zone, (3) introducing a second liquid material into the lower part of the separation zone below the vapor-pervious liquid-impervious zone, (4) withdrawing a vaporous side stream from the lower part of the separation zone at a point below said vapor-pervious liquid-impervious zone and above the point of introduction of either liquid stream, (5) liquefying at least part of the withdrawn vaporous side stream, and (6) reintroducing at least part of the withdrawn liquefied vaporous side stream as at least one of the constituents of the second liquid material introduced into the lower portion of the separation zone.

2. A process according to claim 1 wherein the selective solvent used is a sulfolane solvent.

3. A process according to claim 1 wherein the mixture to be separated is a catalytically reformed gasoline.

4. A process according to claim 1 wherein the mixture to be separated is a refined gasoline, obtained as by-product in the preparation of olefins by means of severe thermal cracking.

5. A process according to claim 1 wherein the mixture to be separated is a refined light hydrocarbon oil.

6. A process according to claim 1 wherein the vapor-pervious liquid-impervious zone is a draw-off tray.

7. In a process for the separation of a mixture by means of a selective solvent boiling higher than the mixture, wherein at least one of the components of the mixture is more readily soluble in the solvent and at least one other component is less readily soluble in the solvent and wherein an extract phase containing the solvent is recovered from an extraction zone and is passed into the upper part of a distillation zone, and wherein the top product withdrawn from the distillation zone consists essentially of at least one of the less readily soluble components, and the bottoms product withdrawn consists essentially of the selective solvent and a side stream is withdrawn consisting essentially of one or more components which are more readily soluble in the solvent, the improvement comprising (1) fitting said distillation zone with a draw-off tray which is situated below the point of introduction of the extract phase and is pervious to vapor but impervious or substantially impervious to liquid, (2) withdrawing the liquid accumulated on said draw-off tray and, without further treatment, discharging the liquid so accumulated at least in part, into such lower part of the distillation zone that there is at least one theoretical stage between the said part and the draw-off tray, (3) introducing a second liquid material into the lower part of the zone below the draw-off tray, and (4) withdrawing a vaporous side stream from the lower part of the distillation zone at a point below said draw-off tray and above the point of introduction of either liquid stream, (5) liquefying at least part of the withdrawn vaporous side stream, and (6) reintroducing at least part of the withdrawn liquefied vaporous side stream as at least one of the constituents making up the second liquid material introduced into the lower portion of the distillation zone.

8. A process according to claim 7 wherein there are three theoretical stages between the draw-off tray and the point of introduction of the liquid accumulated on said draw-off tray.

9. A process according to claim 7 wherein the liquid accumulated on the draw-off tray is removed from the zone and partly evaporated, with the vapor formed being re-introduced into the distillation zone above the draw-off tray, and the remaining liquid being re-introduced into the lower part of the distillation zone.

10. A process according to claim 7 wherein the vaporous side stream is withdrawn from the distillation zone at the theoretical stage immediately below the draw-off tray, and wherein the second liquid material is introduced into the same theoretical stage.

11. A process according to claim 7 wherein the areas of the distillation zone above and below the draw-off tray is provided with trays fitted with preferential discharge zones.

12. A process according to claim 7 wherein the extract phase is introduced at or near the top of the distillation zone without substantial flash vaporization.

13. A process according to claim 12 wherein the extract phase introduced into the distillation zone contains vaporous material in a weight ratio with respect to the fresh feed for the extraction zone of less than about 5:100.

14. In an extractive distillation process for the separation of a mixture by means of a selective solvent boiling higher than the mixture, wherein at least one of the components of the mixture is more readily soluble in the solvent and at least one other component is less readily soluble in the solvent and wherein the solvent and some of the more readily soluble components are recovered from the extractive distillation zone as a bottoms product, and wherein the overhead product withdrawn from the extractive distillation zone consists of at least one of the less readily soluble components, some solvent, and some of the more readily soluble components of the feed, and wherein a side stream is withdrawn consisting of at least one component which is more readily soluble in the solvent and some solvent, the improvement comprising (1) providing said extractive distillation zone with a vapor-pervious liquid-impervious zone which is situated below the points of introduction of the feed and the solvent, (2) withdrawing the liquid accumulated in said zone and, without further treatment, discharging the liquid so accumulated at least in part, into such lower part of the extractive distillation zone that there is at least one theoretical stage between the said part and the vapor-pervious, liquid-impervious zone, (3) introducing a second liquid material into the lower part of the extractive distillation zone below the vapor-pervious zone, and (4) withdrawing a vaporous side stream from the lower part of the extractive distillation zone at a point below said vapor-pervious zone and above the point of introduction of either liquid stream, (5) liquefying at least part of the withdrawn vaporous side stream, and (6) introducing at least part of the withdrawn liquefied vaporous side stream as at least one of the constituents of the second liquid material introduced into the lower portion of the extractive distillation zone.

15. A process according to claim 14 wherein the vaporous side stream is withdrawn from the extractive distillation zone at the theoretical stage immediately below the vapor-pervious, liquid-impervious zone, and wherein the second liquid material is introduced into the same theoretical stage.

16. A process according to claim 14 wherein the vapor-pervious liquid-impervious zone is a draw-off tray.

17. A process according to claim 16 wherein there are three theoretical stages between the draw-off tray and the point of introduction of the liquid accumulated on said draw-off tray.

18. A process according to claim 16 wherein the liquid accumulated on the draw-off tray is removed from the zone and partly evaporated, with the vapor formed being reintroduced into the extractive distillation zone above the draw-off tray, and the remaining liquid being re-introduced into the lower part of the extractive distillation zone.

19. A process according to claim 16 wherein the areas of the extractive distillation zone above and below the draw-off tray is provided with trays fitted with preferential discharge zones.

References Cited by the Examiner

UNITED STATES PATENTS

| 1,952,639 | 3/34 | Thiele | 196—100 |
| 2,029,528 | 2/36 | Gard | 208—355 |
| 2,071,429 | 2/37 | Ragatz | 208—355 |
| 2,324,955 | 6/43 | Rupp et al. | 208—313 |
| 2,952,631 | 9/60 | Hausch | 196—102 |
| 3,065,167 | 11/62 | Zuiderweg et al. | 208—325 |

FOREIGN PATENTS

| 594,099 | 3/60 | Canada. |

ALPHONSO D. SULLIVAN, *Primary Examiner.*